US010579878B1

(12) United States Patent
Barral et al.

(10) Patent No.: US 10,579,878 B1
(45) Date of Patent: Mar. 3, 2020

(54) METHOD FOR COMPARING VIDEOS OF SURGICAL TECHNIQUES

(71) Applicant: Verily Life Sciences LLC, Mountain View, CA (US)

(72) Inventors: Joëlle K. Barral, Mountain View, CA (US); German Bauer, San Jose, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 0 days.

(21) Appl. No.: 16/001,674

(22) Filed: Jun. 6, 2018

Related U.S. Application Data

(60) Provisional application No. 62/526,209, filed on Jun. 28, 2017.

(51) Int. Cl.
*H04N 7/18* (2006.01)
*G06K 9/00* (2006.01)
*G06K 9/42* (2006.01)
*H04N 7/01* (2006.01)
*G06T 7/246* (2017.01)
*H04N 9/64* (2006.01)
*H04N 5/44* (2011.01)
(Continued)

(52) U.S. Cl.
CPC ........... *G06K 9/00744* (2013.01); *G06K 9/42* (2013.01); *G06T 7/0014* (2013.01); *G06T 7/248* (2017.01); *H04N 5/4403* (2013.01); *H04N 5/44591* (2013.01); *H04N 7/0117* (2013.01); *H04N 7/0127* (2013.01); *H04N 9/64* (2013.01); *G06K 2209/057* (2013.01); *G06T 2207/10016* (2013.01); *G06T 2207/20081* (2013.01)

(58) Field of Classification Search
CPC .......... G09B 5/067; G09B 5/14; G16H 50/50; G16H 40/67; A61B 34/25; A61B 2034/252; A61B 90/361; G06K 9/00765; G06K 9/00718
USPC .......................................................... 348/77
See application file for complete search history.

(56) References Cited

U.S. PATENT DOCUMENTS

| | | | |
|---|---|---|---|
| 2012/0210232 A1* | 8/2012 | Wang ................... | G11B 27/034 715/723 |
| 2014/0005484 A1* | 1/2014 | Charles .................. | A61B 17/02 600/201 |
| 2015/0121441 A1 | 4/2015 | Apte et al. | |

(Continued)

OTHER PUBLICATIONS

Quellec, G. et al., "Real-Time Retrieval of Similar Videos with Application to Computer-Aided Retinal Surgery", 33rd Annual International Conference of the IEEE EMBS, Boston, MA, Aug. 30-Sep. 3, 2011, 4 pages.

*Primary Examiner* — Patricia I Young
*Assistant Examiner* — Peet Dhillon
(74) *Attorney, Agent, or Firm* — Christensen O'Connor Johnson Kindness PLLC

(57) ABSTRACT

A method for comparing videos of a surgical procedure is disclosed. The method comprising selecting a plurality of videos from a surgical video database. Each of the plurality of videos including video data of a first surgical procedure comprising a plurality of surgical steps. The method further including identifying a first surgical step included in the plurality of surgical steps within a first video segment in each of the plurality of videos. The method also including warping the first video segment to standardize a dimension of the first video segment in each of the plurality of videos.

26 Claims, 4 Drawing Sheets

(51) Int. Cl.
*H04N 5/445* (2011.01)
*G06T 7/00* (2017.01)

(56) References Cited

U.S. PATENT DOCUMENTS

| | | | |
|---|---|---|---|
| 2015/0208103 A1* | 7/2015 | Guntur | H04N 19/46 |
| | | | 725/61 |
| 2015/0339380 A1 | 11/2015 | Zhang et al. | |
| 2016/0140301 A1 | 5/2016 | Richter et al. | |
| 2016/0259888 A1 | 9/2016 | Liu et al. | |
| 2018/0174616 A1* | 6/2018 | Aguilar | G06K 9/00718 |
| 2018/0247128 A1* | 8/2018 | Alvi | G16H 15/00 |

\* cited by examiner

METHOD FOR COMPARING VIDEOS OF SURGICAL TECHNIQUES

CROSS-REFERENCE TO RELATED APPLICATIONS

This application claims the benefit of U.S. Provisional Application No. 62/526,209, filed Jun. 28, 2017, which is hereby incorporated by reference in its entirety.

TECHNICAL FIELD

This disclosure relates generally to a method for comparing videos, and in particular but not exclusively, relates to a method for comparing videos of surgical techniques.

BACKGROUND INFORMATION

In recent years, the internet, in conjunction with network infrastructure upgrades to increase network throughput, has made the development of content aggregation sites, such as YouTube, Vimeo, Vidme, Streamable, etc, viable to allow users to upload videos for user consumption. These and other content aggregation sites allow users to obtain instant access to previously uploaded videos. The subject matter of uploaded videos varies considerably and may, for example, be utilized for entertainment, news, and learning, among other things.

For example, surgeons often watch videos on YouTube to compare their techniques to those of colleagues, refresh themselves on procedures that they have not performed in a long time, or learn new techniques. Most videos have not been edited, and if they have, each video has been edited in its own way. Therefore, there is no easy nor efficient way to combine information from different videos.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Figure 1A:
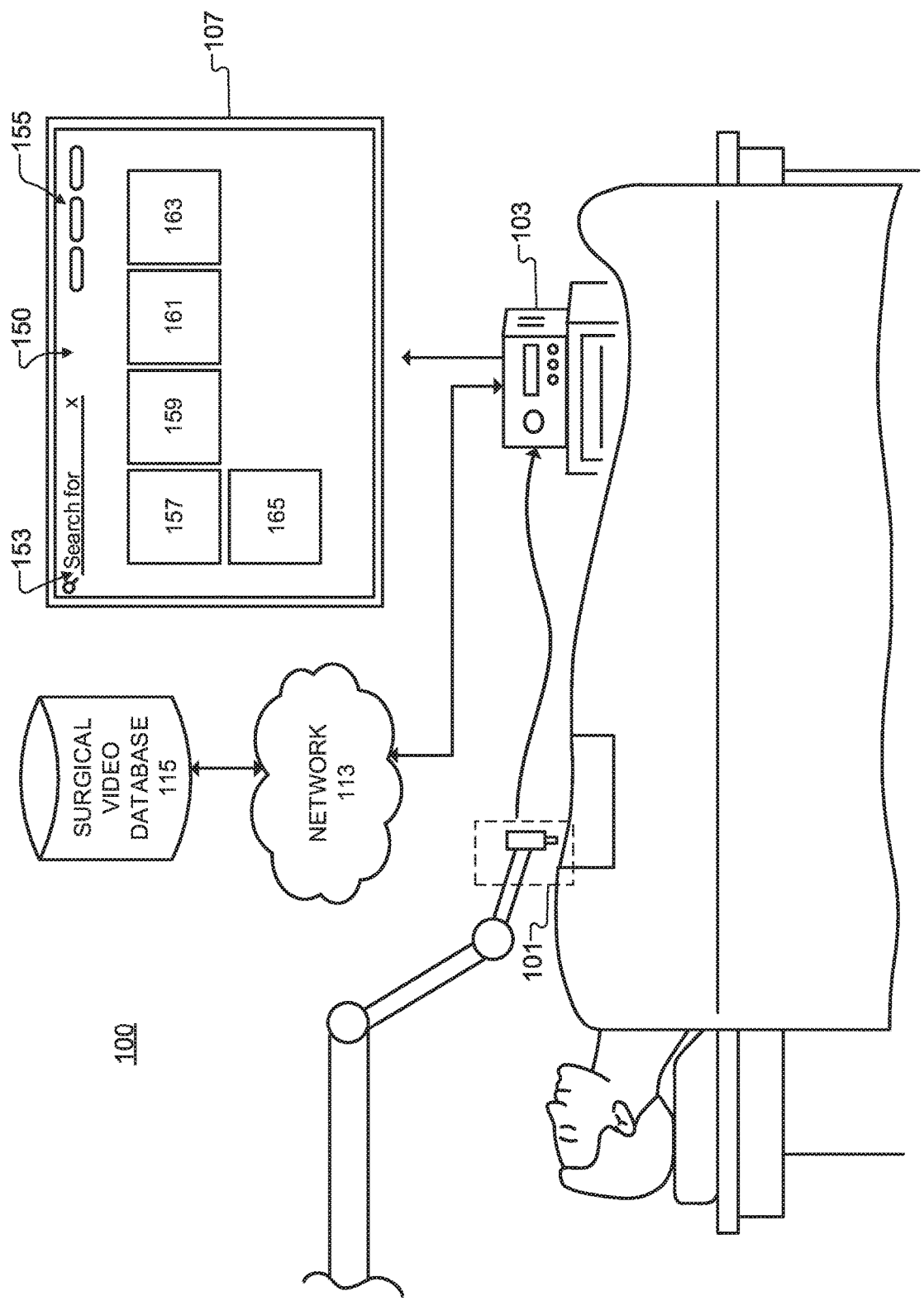
FIG. 1A is an example system for comparing videos of a surgical procedure, in accordance with an embodiment of the disclosure.

Embodiments of an apparatus, system, and method for comparing videos of surgical techniques are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

The following description refers to an image sensor coupled to record video data of surgical procedures performed by a medical professional. However, the presently described embodiments are not limited to image sensors and/or surgical procedures. Rather, the embodiments and techniques described herein are flexible, and can be used in general for comparing videos of related subject matter. However, for the sake of clarity, the following description will be focused on comparing videos of a surgical procedure, and more specifically, a low anterior resection surgical procedure.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "selecting", "identifying", "warping", "adjusting", "analyzing", "determining", "referencing", "generating", "measuring", "modifying", "receiving", "providing", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such as information storage, transmission or display devices.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, embodiments of the present disclosure are not described with reference to any particular programming language. It will be appreciated that a variety of programming languages may be used to implement the teachings of the disclosure as described herein.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1A is an example system 100 for comparing videos of a surgical procedure, in accordance with an embodiment of the disclosure. System 100 includes image sensor 101 (e.g., a video camera), computer system 103, display 107, network 113, and surgical video database 115. Display 107 is displaying user interface 150 output by computer system 103. User interface 150 includes search bar 153, search history 155, and a plurality of videos (including first video 157, second video 159, third video 161, fourth video 163, and fifth video 165).

Image sensor 101 is positioned to record video data of surgical procedures. Computer system 103 is coupled to image sensor 101 to receive the video data and generate surgical video database 115 based on the video data. Surgical video database 115 is coupled to computer system 103 through network 113. Alternatively, surgical video database may be stored locally within computer system 103. In the depicted embodiment, image sensor 101 is directly coupled (wired) to computer system 103, but in other embodiments, there may be intervening pieces of circuitry and computer system 103 may be indirectly coupled (wireless) to image sensor 101. Similarly, in some embodiments, computer system 103 may be part of a distributed system (e.g., many processors and memory units may be used in the calculations to handle the processing). In the depicted embodiment, computer system 103 is part of a system for comparing videos of a surgical procedure. Computer system 103 may output to display 107 illustrating user interface 150 to allow for user interaction with computer system 103 for comparing videos. User interface 150 may be an initial interface to allow the user to select a first surgical procedure from many different surgical procedures stored within surgical video database 115.

In one embodiment, a user of system 100, such as a surgeon or other medical professional, wants to learn the anastomosis step in a low anterior resection (LAR) procedure. The user may input into search bar 153 a keyword to search for a first surgical procedure such as the LAR procedure. The search may retrieve videos with similar length, similar content (content-based video retrieval), or the like. Alternatively, if the user has previously used search bar 153 to search for the LAR procedure, search history 155 may have a clickable link that the user can select with an input device to quickly initiate a search without having to directly type within search bar 153. Based on the input of the user, computer system 103 searches surgical video database 115 and pulls a plurality of videos (including first video 157, second video 159, third video 161, fourth video 163, and fifth video 165) of a first surgical procedure (e.g., the LAR procedure) from surgical video database 115. Computer system 103 then displays thumbnails of the plurality of videos within user interface 150 on display 107 for video playback.

The first surgical procedure may comprise a plurality of surgical steps, but the user may only be interested in a first surgical step (e.g., the anastomosis step) included in the plurality of surgical steps. The user may review the first surgical step by selecting one of the plurality of videos (e.g., first video 157) and manually searching for and subsequently watching the anastomosis step within the video. However, the user may want to review many, if not all, of the plurality of videos in order to review as many variations of the surgical technique as needed in order to adequately learn the surgical technique for the first surgical procedure. Accordingly, the user may initialize computer system 103 to compare videos of surgical procedures.

Figure 1B:
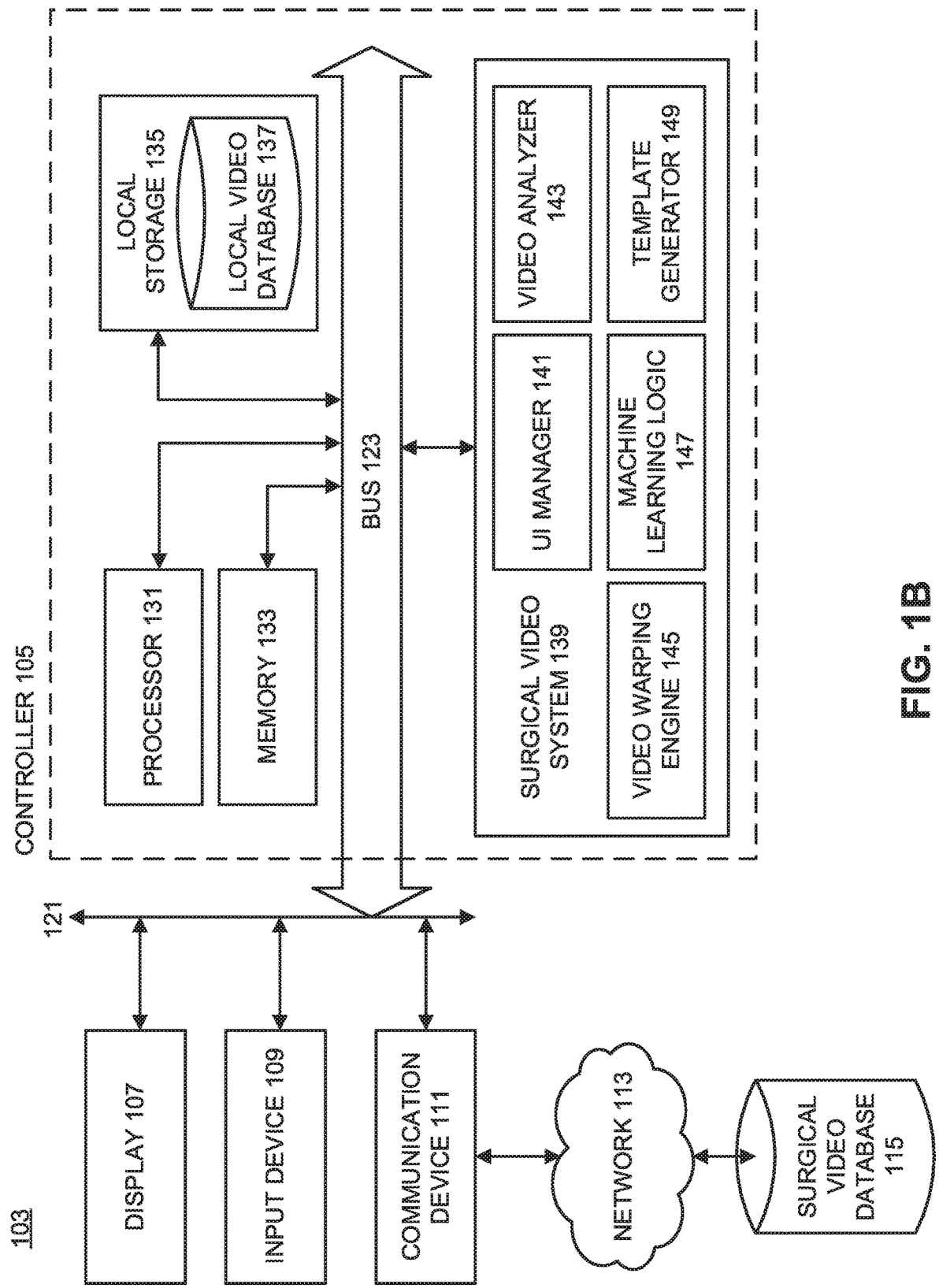
FIG. 1B is a block diagram illustrating an example computer system included in the example system of FIG. 1A for comparing videos of a surgical procedure, in accordance with an embodiment of the disclosure.

FIG. 1B is a block diagram illustrating an example computer system 103 included in the example system of FIG. 1A for comparing videos of a surgical procedure, in accordance with an embodiment of the disclosure. Computer system 103 includes controller 105, display 107, input device 109, communication device 111, network 113, surgical video database 115, bus 121, and bus 123. Controller 105 includes processor 131, memory 133, local storage 135, and surgical video system 139. Local storage 135 may include local video database 137. Surgical video system 139 includes user interface (UI) manager 141, video analyzer 143, video warping engine 145, machine learning logic 147, and template generator 149. However, one of ordinary skill in the art will appreciate that in some embodiments controller 105 may be a distributed system.

Controller 105 may further be coupled to display 107, such as a light emitting diode (LED) display, a liquid crystal display (LCD), etc., coupled to bus 121 through bus 123 for displaying information to a user, such as a medical professional utilizing the system for comparing videos of a surgical procedure. Input device 109, may also be coupled to bus 121 through bus 123 for communicating information and command selections to processor 131. Input device 109 may include image sensor 103, as well as other input devices, such as a mouse, trackball, keyboard, stylus or other computer peripheral, to facilitate an interaction between the user and controller 105. In response, controller 105 may provide verification of the interaction through display 107.

Another device, which may optionally be coupled to controller 105, is a communication device 111 for accessing other nodes of a distributed system via network 113. In some embodiments, surgical video database 115 is coupled to controller 105 over bus 123 through network 113. Communication device 111 may include any of a number of commercially available networking peripheral devices such as those used for coupling to an Ethernet, token ring, Internet, or wide area network. Communication device 111 may further be a null-modem connection, or any other mechanism that provides connectivity between controller 105 and the outside world. Note that any or all of the components of this system illustrated in FIG. 1B and associated hardware may be used in various embodiments of the present disclosure.

Processor 131, memory 133, local storage 135, and surgical video system 139 are coupled to each other through bus 123. Controller 105 includes software (e.g., instructions included in memory 133 coupled to processor 131) and/or hardware (e.g., application specific integrated circuits, field-programmable gate arrays, and the like) logic when executed by controller 105 causes controller 105 (or the system 103) to perform operations. The operations may be based on instructions stored within any one of, or a combination of, memory 133, local storage 135, surgical video system 139, and an external storage site accessed through network 113.

In one embodiment, user interface (UI) manager 141 of surgical video system 139 displays the user interface on display 107 to allow the user to input a keyword for performing the search. As discussed above, the user may search for the first surgical procedure (e.g., the LAR procedure). After receiving the input by the user, controller 105 accesses surgical video database 115 and selects a plurality of videos from surgical video database 115 that are related or otherwise include the first surgical procedure. Controller

105 may store the plurality of videos in memory 133 of the computer system 103, or by other methods, such as indexing the plurality of videos into local video database 137 that is included in local storage 135.

Controller 105 then identifies the first surgical step (e.g., the anastomosis step) included in the plurality of surgical steps within a first video segment in each of the plurality of videos. In one embodiment, UI manager 141 may display an interface that allows the user to select the first surgical step in a first video included in the plurality of videos. The user may select the first surgical step by annotating the first video with a start marker and a stop marker to identify the first video segment of the first video. Machine learning logic 147 may then select the first video segment in other videos (e.g., not the first video) included in the plurality of videos. Alternatively, machine learning logic 147 may delineate each of the plurality of surgical steps into a plurality of video segments (including the first video segment) in each of the plurality of videos.

Controller 105 may then utilize video warping engine 145 to standardize a dimension of the first video segment in each of the plurality of videos by warping the first video segment. Standardizing a dimension of the first video segment facilitates a comparison of each of the plurality of videos. The dimension of the first video segment is a term meant to signify a recurrent feature or characteristic that can be identified within the content of, or otherwise related to, the plurality of videos.

In one embodiment, the dimension is a temporal dimension that includes a duration of the first video segment. Warping the first video segment may include adjusting the duration (e.g., stretch or squeeze the first video segment to increase or decrease the duration) of the first video segment to provide an equal runtime of the first video segment in each of the plurality of videos. In other words, the first video segment from at least two different videos (e.g., the first video and the second video) can be compared to each other in parallel since they have the same duration. The equal runtime of the first video segment may facilitate an easier comparison between surgical videos in situations, for example, when the plurality of videos depicts different medical professionals performing the first surgical step at different speeds.

In some embodiments, standardizing the temporal dimension enables determining when a recurrent feature or aspect of the plurality of videos occurs. For example one or more of the plurality of videos may include idle time. In some embodiments, the idle time may correspond to when one or more of the surgical instruments are not moving or not being activated during one or more portions of the plurality of videos. Idle time may also be defined in a variety of others ways, but may generally be described as when nothing of significance occurs during the one or more portions. This information may be utilized to provide a metric such as when (e.g., during a specific surgical step of the surgical procedure) or how often idle time occurs. For example, in some embodiments, a median or mean percentage of the total surgical procedure that is idle time may be calculated (e.g., 5% of a prostatectomy is spent idle—if a given surgeon spends 20% idle, something is wrong). After standardization of the temporal dimension (e.g., stretch and/or squeeze in the temporal dimension to map the plurality of videos to a given total duration), the aggregate temporal location of idle time during a surgical procedure determined from a plurality of surgical videos of a specific surgical procedure may be useful for identifying or determining when a particularly challenging or complicated surgical step may occur within the specific surgical procedure.

Video warping engine 145 may adjust the duration of the first video segment by assigning a second frame rate to the first video segment that is different than a first frame rate of each of the plurality of videos. For example, the first frame rate may represent real-time playback while the second frame rate may represent playback at a speed greater or less than real-time playback. In some embodiments, temporal interpolation may be utilized to determine the appropriate frame rate to assign to different video segments.

In another embodiment, the first frame rate and the second frame rate for the first video segment may not be the same for each of the plurality of videos. For example, video recordings may be based on different video standards for different videos in the plurality of videos. These standards may include NTSC and PAL standards which have a real-time playback frame rate of 29.97 frames per second (fps) and 25 fps, respectively. However, in other embodiments, each of the plurality of videos may share a common frame rate representing real-time playback, or playback can be at an increased speed for faster consumption (for all videos). Controller 105 may use video warping engine 145 to adjust the duration by duplicating image frames included in the video data that correspond to a portion of the first video segment. The duplicated image frames may subsequently be embedded into the first video segment to increase the duration of the first video segment. In a similar manner, image frames included in the video data may be removed to decrease the duration of the first video segment.

In one embodiment, the dimension is a spatial dimension corresponding to a resolution of the first video segment. Warping the first video segment may include identifying an object included in the first video segment in each of the plurality of videos. The object may be a surgical tool or an anatomical part. Machine learning logic 147, image processing techniques, or computer vision techniques may, using any one of a variety of techniques, be utilized to identify the object. The techniques used by machine learning logic 147 may include a variety of methods such as those included in supervised learning and unsupervised learning techniques. The user may select the object from the first video by outlining the object with input device 109 in the first video to provide a baseline for machine learning logic 147 to determine the object in other videos (e.g., not the first video) included in the plurality of videos. In other embodiments, machine learning logic 147 may identify the object without the aid of the user.

Warping the first video segment may include adjusting the resolution of the first video segment to scale a size of the object to a reference in each of the plurality of videos with controller 105. The plurality of videos may be warped by controller 105 such that the size of the object is standardized to provide the same field of view for the first video segment in each of the plurality of videos. The reference may be a measurement of the object included in the first video of the plurality of videos. Measurement of the object may be accomplished via machine learning logic 147, or other logic, identifying the geometric details of the object within the plurality of videos. Alternatively, the measurement may be accomplished via user input selecting or outlining the object within the first video included in the plurality of videos.

In one embodiment, the object is a colon that the anastomosis step (e.g., the first surgical step corresponding to the first video segment) of the LAR procedure (e.g., the first surgical procedure) is being performed on. The colon may have a range of sizes within the plurality of videos due to the standard range of anatomical variations or due to the plurality of videos providing a different field of view of the surgical procedure (e.g., the first video is zoomed in relative to the second video). Controller 105 may adjust the resolution of the plurality of videos to scale the size of the colon to the reference. The reference may be a measurement of the colon, such as a diameter, in the first video included in the plurality of videos. Adjusting the resolution of the first video segment in the plurality of videos allows for the user to review the anastomosis step in each of the plurality of videos under the same field of view. This may allow the user to easily see differences between videos, or for example, compare suturing step sizes, etc.

After warping the plurality of videos to standardize the dimension, controller 105 may generate a template to compare to the first video segment in each of the plurality of videos. The template is a typical technique for the first surgical step that is determined by template generator 149 in combination with machine learning logic 147 and processor 131 by analyzing the first video segment in each of the plurality of videos. The template may represent a baseline surgical technique or a way of performing the first surgical step. For example, a majority of medical professionals may use the typical technique to perform the first surgical step. However, there may be outlier techniques that may be advantageous to use under certain circumstances. Alternatively, or in addition, the technique used to perform the first surgical step may be different based on a level of experience of the medical professional. Generating the template (e.g., the common denominator of the videos or the first vector in an SVD of the set of videos) may include identifying features or characteristics of the plurality of videos to determine the typical technique. The typical technique may be determined by identifying at least one of a duration, an object, or a motion included in the first video segment of the plurality videos.

The template helps the user visualize differences between the typical technique and outlier techniques which may facilitate an improvement in their own techniques. Controller 105 may determine whether the first video segment in each of the plurality of videos deviates from the template in order to make the differences more readily apparent. After determining which videos deviate from the template, controller 105 may identify a first subset of videos, included in the plurality of videos, that deviate from the template. As a way of presenting the first subset of videos to the user, controller 105 may modify the first subset of videos by adjusting at least one of a first color space of the first video segment or a second color space of other video segments (e.g., not the first video segment) included in each of the first subset of videos. The first color space may be a standard RGB color space while the second color space is a grayscale color space. In this manner, the other video segments may have a grayscale color space such that during playback the first video segment of the first subset of videos stands out to the user. Alternatively, contour of a first color and a second color may be added to the first subset of videos and the other videos respectively. The first color of the first subset of videos may be red and the second color of the other videos may be green. The contour may indicate which videos deviate by highlighting a border or outside perimeter of the plurality of videos during playback.

In another embodiment, the template is generated based on the typical technique used for knot tying in the anastomosis step (e.g., the first video segment or first surgical step) of the LAR procedure (e.g., the first surgical procedure). The knot tying technique may vary throughout the plurality of videos due to reasons such as surgeon experience, anatomical size, or other specific situations. Processor 133 may use machine learning logic 147 to analyze the plurality of videos and determine a motion or series of motions that are representative of a typical knot tying technique to generate the template to compare to the anastomosis step in each of the plurality of videos.

Controller 105 may determine whether the knot tying technique of the anastomosis step in each of the plurality of videos deviates from the typical knot tying technique with the template. After determining which of the plurality of videos deviate, controller 105 may select or identify the first subset of videos, that have a knot tying technique which deviates from the typical knot tying technique, and other videos (e.g., not the first subset of videos) that do not deviate from the typical knot tying technique. Controller 105 may modify the plurality of videos and assign a first color space to the first subset of videos and a second color space to the other videos. The second color space of the other videos may be the gray scale color space while the first color space may be the standard RGB color space such that the knot tying technique of the anastomosis step that deviates from the typical knot tying technique is visually distinguishable via color space and stands out to the user during playback. To display the plurality of videos in parallel within the user interface, controller 105, including UI manager 141, generates output data.

Figure 2:
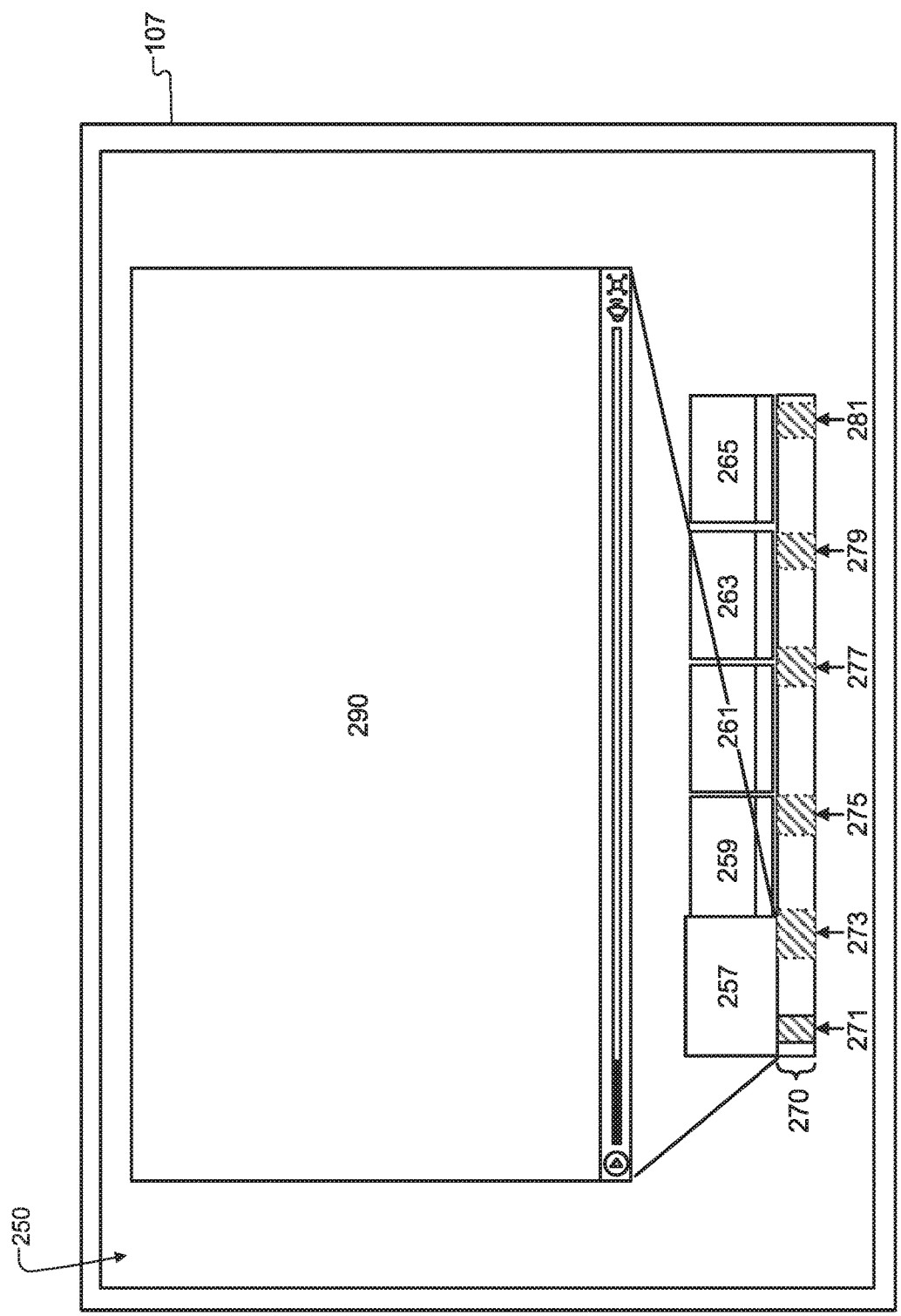
FIG. 2 is an example user interface for comparing videos of a surgical procedure that may be output by the system of FIG. 1B, in accordance with an embodiment of the disclosure.

FIG. 2 is an example user interface 250 output for comparing videos of a surgical procedure that may be used in the system of FIG. 1B, in accordance with an embodiment of the disclosure. User interface 250 is output to display 107 by UI manager 141 of controller 105 from FIG. 1B. As illustrated in FIG. 2, user interface 250 allows the user to view the plurality of videos (including first video 257, second video 259, third video 261, fourth video 263, and fifth video 265), navigation bar 270 (including identifiers 271, 273, 275, 277, 279, and 281), and enlarged display 290.

User interface 250 displays the plurality of videos (257, 259, 261, 263, and 265) in parallel or one at a time. An enlarged display 290 of one of the plurality of videos helps the user focus on a selected video. In the illustrated embodiment, enlarged display 290 presents a larger view of first video 257, which has been selected by the user.

At least one of the plurality of videos has had the first video segment warped to standardize the dimension of the plurality of videos, in accordance with embodiments of the present disclosure. Navigation bar 270 may provide details of the selected video (e.g., first video 257) to visually indicate whether the first video segment of first video 257 deviates from the template. Navigation bar 270 is a temporal map of the selected video (e.g., first video 257) and includes identifiers (271, 273, 275, 277, 279, and 281) representing the first video segment of the first surgical step as well as other video segments (e.g., not the first video segment) of other surgical steps (e.g., not the first surgical step). The first surgical step is represented by identifier 271 and the other surgical steps are represented by identifiers 273, 275, 277, 279, and 281. The identifiers may help the user identify and quickly access individual surgical steps (e.g., the first surgical step) included in the plurality of surgical steps of the surgical procedure. The identifiers may be color coded to visually indicate which video segments, such as the first video segment and other video segments, deviate from the template. The first video segment of the first video may deviate from the template and subsequently be represented within the navigation bar via a first color. Segments that do not deviate from the template may be represented within the navigation bar as a second color. The first color being different than the second color. The identifiers may also indicate a relative strength of deviation of the first or other video segments from the template via a graduation of color. In one embodiment, first identifier 271 has a uniform representation of color indicating the deviation of the first video segment from the template is significant.

The significance of deviation may be determined by machine learning logic or other logic, in accordance with embodiments of the present disclosure. A deviation from the template may be determined based on a particular metric, such as a difference in motion (or in smoothness of motion), a difference in tool type, or a difference in tool position, shape, etc. between the first or other video segments and the template. For example, the typical knot tying technique of the anastomosis step may be a two-handed surgical tie. The knot tying technique of the first video segment within the first video may utilize a one-handed surgical tie. Machine learning logic, or other logic, may identify the difference in motion and identify the first video segment as deviating from the template. In the same or another embodiment, one of the identifiers (271, 273, 275, 277, 279, and 281) may have a graduated color indicating a less significant deviation from the template. Thus, navigation bar 270 may help a user quickly view segments that deviate from the template.

Figure 3:
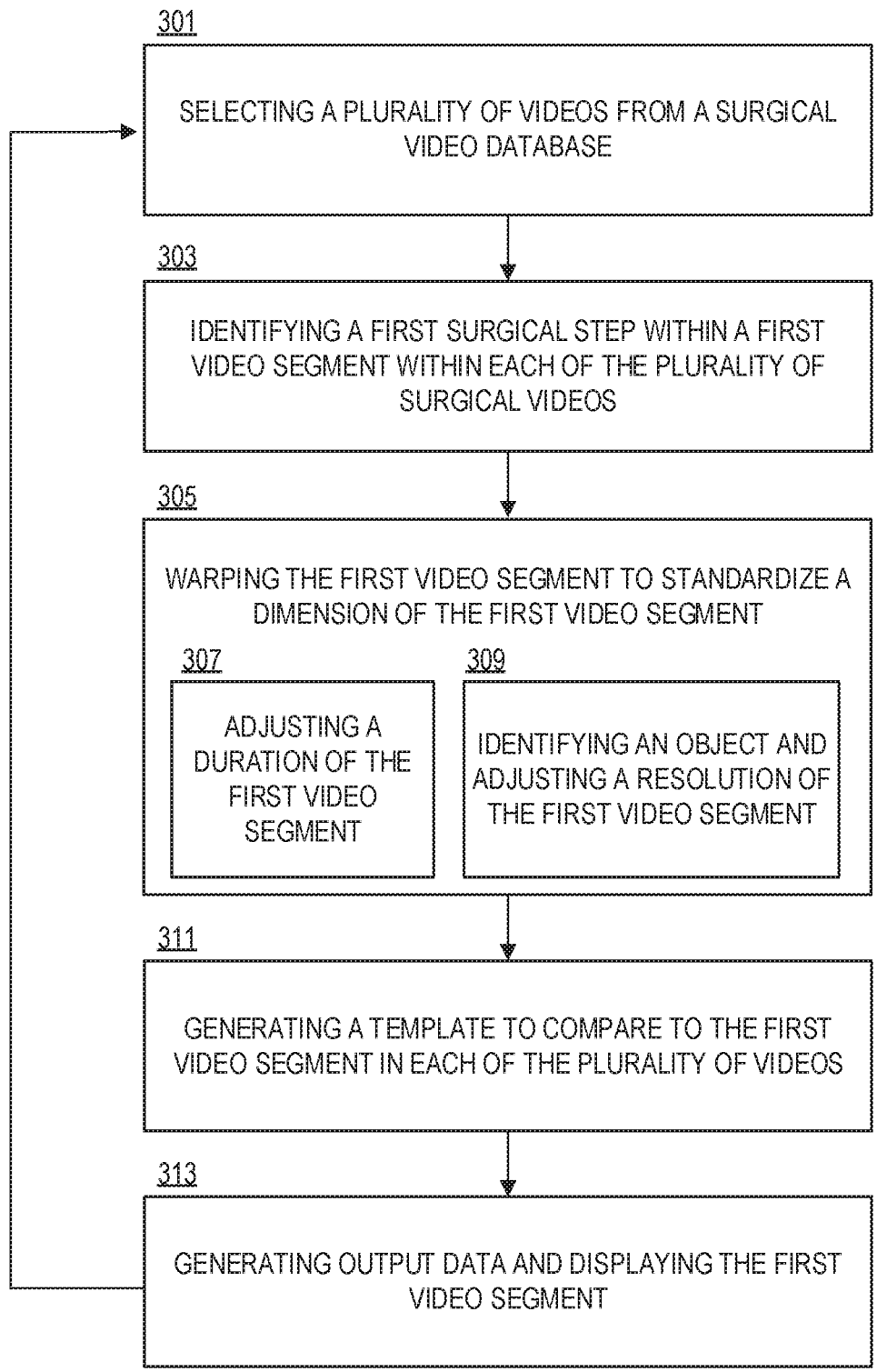
FIG. 3 is a flow-chart describing a method for comparing videos of a surgical procedure, in accordance with several embodiments of the disclosure.

FIG. 3 is a flow-chart describing a method for comparing videos of a surgical procedure, in accordance with several embodiments of the disclosure. The order in which some or all of process blocks appear in method 300 should not be deemed limiting. Rather, one of ordinary skill in the art having the benefit of the present disclosure will understand that some of method 300 may be executed in a variety of orders not illustrated, or even in parallel. Moreover, process blocks may be added or removed in other embodiments of the disclosure. Method 300 may be at least in part cyclical, as illustrated.

Block 301 illustrates selecting a plurality of videos from a surgical video database, each including video data of a first surgical procedure comprising a plurality of surgical steps. The plurality of videos may be selected by accessing a surgical video database via a computer system (e.g., system 100 from FIG. 1A) as discussed in accordance with embodiments of the present disclosure. The plurality of videos may be selected based on a keyword search provided to the computer system by a user. The keyword search may be a specific term of art, such as a particular surgical procedure, anatomical part, or surgical tool. Based on the keyword search, the surgical video database may be searched and a plurality of videos related to the first surgical procedure may be selected. The plurality of videos may be stored in memory of the computer system, or by other methods, such as indexing the plurality of videos into a local video database that is included in local storage.

Block 303 shows identifying a first surgical step included in the plurality of surgical steps within a first video segment in each of the plurality of videos. In one embodiment, the user may select the first surgical step in a first video included in the plurality of videos. Machine learning logic may then select the first surgical step in other videos (e.g., not the first video) included in the plurality of videos. Alternatively, the machine learning logic may delineate each of the plurality of surgical steps (including the first surgical step) in each of the plurality of videos.

Block 305 illustrates warping the first video segment to standardize a dimension of the first video segment in each of the plurality of videos. Standardizing a dimension of the first video segment facilitates a comparison of each of the plurality of videos. The dimension of the first video segment is a term meant to signify a recurrent feature or characteristic that can be identified within the content of or otherwise related to the plurality of videos. In some embodiments, the warping can be based on additional data, for example instrument data from the robot. In one embodiment, this could be when a stapler is inserted and when the stapler is removed as events that can utilized to align videos.

Blocks 307 and 309 illustrate two possible dimensions of a plurality of videos that can be standardized, but they should not be deemed limiting as the only possible dimensions. Rather, it is appreciated that one of ordinary skill in the art will recognize other dimensions of the plurality of videos which can also be standardized.

Block 307 shows that the dimension is a temporal dimension that includes a duration of the first video segment. Warping the first video segment may include adjusting the duration of the first video segment to provide an equal runtime of the first video segment in each of the plurality of videos. In one embodiment, each of the plurality of videos has a first frame rate that corresponds to real-time playback. Adjusting the duration of the first video segment may include assigning a second frame rate to the first video segment. The second frame rate being different than the first frame rate. In some embodiments, there could then be some visual indication that the video has been sped or slowed down up (e.g., "2×") overlaid on the frame. This may become important when different parts of the procedure are sped up differently to align with a different procedure. For example, first segment at 1×, second segment at 3×, third segment at 0.4×, etc.

Block 309 illustrates that the dimension is a spatial dimension corresponding to a resolution of the first video segment. Warping the first video segment may include identifying an object included in the first video segment in each of the plurality of videos. The object, for example, may be an anatomical part, a surgical tool, or other distinguishing feature within the plurality of videos. Machine learning logic may, using any one of a variety of techniques described above, be utilized to identify the object or feature. In one embodiment, the user may select the object by identifying the object then outlining the object with an input device in a first video to provide a baseline for the machine learning logic to determine the object in other videos (e.g., not the first video) included in the plurality of videos. The machine learning logic may then identify the object in other videos and determine one or more of the plurality of videos that are warped to standardize a dimension of the object across each of the plurality of videos. In other embodiments, the machine learning logic may identify the object without the aid of a user. Warping the first video segment may also include adjusting the resolution of the first video segment to scale a size of the object to a reference in each of the plurality of videos. The reference may be a measurement of the object included in the video. The measurement of the object may be accomplished by identifying the geometric details of the object (or a reference object) within the plurality of videos.

Block 311 shows generating a template to compare to the first video segment in each of the plurality of videos. The template is a typical technique for the first surgical step that is determined by machine learning logic that analyzes the first video segment in each of the plurality of videos. The template may represent a baseline surgical technique or way of performing the first surgical step. Generating the template may include identifying features or characteristics of the plurality of videos to determine the typical technique. In one embodiment, the typical technique is determined by identifying at least one of a duration, an object, or a motion included in the first video segment of the plurality of videos.

The template allows for determining differences between the typical technique and outlier techniques. Block 311 may also include determining whether the first video segment in each of the plurality of videos deviates from the template. After determining which videos deviate from the template, Block 311 includes identifying a first subset of videos that have the first video segment which deviates from the template. Block 311 further includes modifying the first subset of videos by adjusting at least one of a first color space of the first video segment or a second color space of other video segments (e.g., not the first video segment) included in each of the first subset of videos.

Block 313 illustrates generating output data to display the plurality of videos in parallel within a user interface. The user interface includes a navigation bar to visually indicate whether the first video segment of a first video included in the plurality of videos deviates from the template. In one embodiment, the navigation bar is a temporal map of at least the first video and includes the first video segment of the first surgical step as well as other video segments (e.g., not the first video segment) of other surgical steps (e.g., not the first surgical step) included in the plurality of surgical steps. Block 3013 further includes color coding the navigation bar to visually indicate which of the video segments, such as the first video segment and other video segments, deviate from the template. The first video segment of the first video may deviate from the template and subsequently be represented within the navigation bar via a first color. Other video segments that do not deviate from the template may be represented within the navigation bar as a second color. The first color being different from the second color.

A video segment that deviates from the template may be determined based on a particular metric. The particular metric may include at least one of a difference in motion, a difference in tool type, and a difference in tool position, shape, motion, etc. The metric may be a variable determined by the user or the machine learning logic, for example, the user may select a threshold based on a percentage of duration of the video segment that deviates from the template. If a first percentage of the video segment that deviates from the template is greater than the percentage, the video segment may be identified as deviating from the template. Block 313 may also include displaying the first video segment of at least the first video and a second video included in the plurality of videos in parallel. The dimension of the first video segment is standardized by warping at least one of the first video or the second video.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

Embodiments of the present disclosure may also be included in a handheld or portable device, such as a tablet computer system, laptop computer system, smartphone, smart glasses, etc., containing a subset of the computer hardware components described above. The handheld or portable device may also be configured to include a set of buttons or input signaling components with which a user may select from a set of available options. The handheld or portable device may also be configured to include an output apparatus such as a liquid crystal display (LCD) for displaying information to a user of the handheld or portable device. Conventional methods may be used to implement such a handheld or portable device. The implementation of embodiments would be apparent to one of ordinary skill in the art given the disclosure provided herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for comparing videos of a surgical procedure, comprising:
    selecting a plurality of videos from a surgical video database, each including video data of a first surgical procedure comprising a plurality of surgical steps;
    identifying a first surgical step included in the plurality of surgical steps within a first video segment in each of the plurality of videos, including:
        receiving the first surgical step in a first video included in the plurality of videos; and
        selecting, using machine learning logic, the first surgical step in other videos included in the plurality of videos, and wherein the first video is not included in the other videos;
    warping the first video segment to standardize a dimension of the first video segment in each of the plurality of videos; and
    displaying the first video segment of at least a first video and a second video included in the plurality of videos in parallel, wherein the dimension of the first video segment is standardized by warping at least one of the first video or the second video.

2. The method of claim 1, wherein the dimension includes a temporal dimension that includes a duration of the first video segment, and wherein warping the first video segment further includes:
    adjusting the duration of the first video segment to provide an equal runtime of the first video segment in each of the plurality of videos.

3. The method of claim 2, wherein each of the plurality of videos includes a first frame rate that corresponds to real-time playback, wherein adjusting the duration of the first video segment includes assigning a second frame rate to the first video segment, and wherein the first frame rate is different than the second frame rate.

4. The method of claim 1, wherein the dimension includes a spatial dimension that corresponds to a resolution of the first video segment, wherein warping the first video segment further includes:
identifying an object included in the first video segment in each of the plurality of videos; and
adjusting the resolution of the first video segment to scale a size of the object to a reference in each of the plurality of videos.

5. The method of claim 4, wherein identifying the object is determined by machine learning logic.

6. The method of claim 4, wherein the object includes at least one of an anatomical part or a surgical tool.

7. The method of claim 4, wherein the plurality of videos includes a first video, and wherein the reference is a measurement of the object included in the first video.

8. The method of claim 1, further comprising:
generating a template to compare to the first video segment in each of the plurality of videos, wherein the template is a typical technique for the first surgical step that is determined by the machine learning logic that analyzes the first video segment in each of the plurality of videos.

9. The method of claim 8, wherein generating the template includes:
identifying at least one of a duration, an object, or a motion included in the first video segment of the plurality videos to determine the typical technique for the first surgical step.

10. The method of claim 9, further comprising:
determining whether the first video segment in each of the plurality of videos deviates from the template; and
identifying a first subset of videos included in the plurality of videos, wherein the first video segment included in each of the first subset of videos deviates from the template.

11. The method of claim 10, further comprising:
modifying the first subset of videos by adjusting at least one of a first color space of the first video segment or a second color space of other video segments included in each of the first subset of videos, wherein the other video segments are different than the first video segment, and wherein the first color space is different than the second color space.

12. The method of claim 10, further comprising:
generating output data to display the plurality of videos in parallel within a user interface, wherein the user interface includes a navigation bar to visually indicate whether the first video segment of a first video included in the plurality of videos deviates from the template.

13. The method of claim 1, wherein identifying the first surgical step includes a user selecting the first surgical step in the first video included in the plurality of videos.

14. A non-transitory machine readable storage medium having instructions stored thereon, which, when executed by one or more processors, cause the one or more processors to perform a method comprising:
selecting a plurality of videos from a surgical video database, each including video data of a first surgical procedure comprising a plurality of surgical steps;
identifying a first surgical step included in the plurality of surgical steps within a first video segment in each of the plurality of videos, including:
receiving the first surgical step in a first video included in the plurality of videos; and
selecting, using machine learning logic, the first surgical step in other videos included in the plurality of videos, and wherein the first video is not included in the other videos;
warping the first video segment to standardize a dimension of the first video segment in each of the plurality of videos;
displaying the first video segment of at least a first video and a second video included in the plurality of videos in parallel, wherein the dimension of the first video segment is standardized by warping at least one of the first video or the second video.

15. The non-transitory machine readable storage medium of claim 14, wherein the dimension includes a temporal dimension that includes a duration of the first video segment, and wherein warping the first video segment further includes:
adjusting the duration of the first video segment to provide an equal runtime of the first video segment in each of the plurality of videos.

16. The non-transitory machine readable storage medium of claim 15, wherein each of the plurality of videos includes a first frame rate that corresponds to real-time playback, wherein adjusting the duration of the first video segment includes assigning a second frame rate to the first video segment, and wherein the first frame rate is different than the second frame rate.

17. The non-transitory machine readable storage medium of claim 14, wherein the dimension includes a spatial dimension that corresponds to a resolution of the first video segment, wherein warping the first video segment further includes:
identifying an object included in the first video segment in each of the plurality of videos; and
adjusting the resolution of the first video segment to scale a size of the object to a reference in each of the plurality of videos.

18. The non-transitory machine readable storage medium of claim 17, wherein identifying the object is determined by the machine learning logic.

19. The non-transitory machine readable storage medium of claim 17, wherein the object includes at least one of an anatomical part or a surgical tool.

20. The non-transitory machine readable storage medium of claim 17, wherein the plurality of videos includes a first video, and wherein the reference is a measurement of the object included in the first video.

21. A system for comparing videos of a surgical procedure, the system comprising:
an image sensor coupled to record video data of surgical procedures; and
a controller coupled to the image sensor to receive the video data and generate a surgical video database based on the video data, wherein the controller includes logic that when executed by the controller causes the controller to perform operations including:
selecting a plurality of videos from the surgical video database, each including a first surgical procedure comprising a plurality of surgical steps;
identifying a first surgical step included in the plurality of surgical steps within a first video segment in each of the plurality of videos, including:
receiving the first surgical step in a first video included in the plurality of videos; and selecting, using machine learning logic, the first surgical step in other videos included in the plurality of videos, and wherein the first video is not included in the other videos; and warping the first video segment to standardize a dimension of the first video segment in each of the plurality of videos, wherein the dimension includes a spatial dimension that corresponds to a resolution of the first video segment, and wherein the warping includes:

identifying an object included in the first video segment in each of the plurality of videos; and adjusting the resolution of the first video segment to scale a size of the object to a reference in each of the plurality of videos.

22. The system of claim 21, wherein the dimension is a temporal dimension that includes a duration of the first video segment, and wherein warping the first video segment further includes:

adjusting the duration of the first video segment to provide an equal runtime of the first video segment in each of the plurality of videos.

23. The system of claim 21, wherein identifying the object is determined by the machine learning logic.

24. The system of claim 21, wherein the object includes at least one of an anatomical part or a surgical tool, wherein the plurality of videos includes a first video, and wherein the reference is a measurement of the object included in the first video.

25. A non-transitory machine readable storage medium having instructions stored thereon, which, when executed by one or more processors, cause the one or more processors to perform a method comprising:

selecting a plurality of videos from a surgical video database, each including video data of a first surgical procedure comprising a plurality of surgical steps;

identifying a first surgical step included in the plurality of surgical steps within a first video segment in each of the plurality of videos;

warping the first video segment to standardize a dimension of the first video segment in each of the plurality of videos;

generating a template to compare to the first video segment in each of the plurality of videos, wherein the template is representative of a typical technique for the first surgical step that is determined by machine learning logic that analyzes the first video segment in each of the plurality of video; and determining whether the first video segment in each of the plurality of videos deviates from the template; and identifying a first subset of videos included in the plurality of videos, wherein the first video segment included in each of the first subset of videos deviates from the template.

26. A non-transitory machine readable storage medium having instructions stored thereon, which, when executed by one or more processors, cause the one or more processors to perform a method comprising:

selecting a plurality of videos from a surgical video database, each including video data of a first surgical procedure comprising a plurality of surgical steps;

identifying a first surgical step included in the plurality of surgical steps within a first video segment in each of the plurality of videos, including:

receiving, selected by a user, the first surgical step in a first video included in the plurality of videos; and selecting, using machine learning logic, the first surgical step in the other videos included in the plurality of videos, and wherein the first video is not included in the other videos; and warping the first video segment to standardize a dimension of the first video segment in each of the plurality of videos.

* * * * *